US008694244B2

(12) United States Patent
Schalk

(10) Patent No.: US 8,694,244 B2
(45) Date of Patent: *Apr. 8, 2014

(54) SYSTEMS AND METHODS FOR OFF-BOARD VOICE-AUTOMATED VEHICLE NAVIGATION

(71) Applicant: Agero Connected Services, Inc., Irving, TX (US)

(72) Inventor: Thomas Barton Schalk, Plano, TX (US)

(73) Assignee: Agero Connected Services, Inc., Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/937,335

(22) Filed: Jul. 9, 2013

(65) Prior Publication Data
US 2013/0297200 A1 Nov. 7, 2013

Related U.S. Application Data

(63) Continuation of application No. 11/029,971, filed on Jan. 5, 2005, now Pat. No. 7,373,248, and a continuation of application No. 12/057,984, filed on Mar. 28, 2008, now Pat. No. 7,634,357, and a continuation of application No. 12/636,327, filed on Dec. 11, 2009, now Pat. No. 8,478,520, and a continuation of application No. 13/901,961, filed on May 24, 2013, and a continuation of application No. 13/908,421, filed on Jun. 3, 2013, and a continuation of application No. 13/909,490, filed on Jun. 4, 2013.

(51) Int. Cl.
*G10L 15/00* (2013.01)
*G10L 15/04* (2013.01)
*G10L 15/20* (2006.01)
*G06F 17/00* (2006.01)
*G06F 19/00* (2011.01)
*G01C 21/34* (2006.01)

(52) U.S. Cl.
USPC ...... 701/420; 701/427; 701/539; 340/995.12; 340/995.23; 704/231; 704/246; 704/251

(58) Field of Classification Search
USPC ............... 701/1, 36, 400, 408, 409, 420, 427, 701/532, 533, 537, 538, 539; 340/989, 340/995.12, 995.16; 704/200, 231, 246, 704/251
See application file for complete search history.

(56) References Cited

U.S. PATENT DOCUMENTS 6,351,698 B1 2/2002 Kubota
6,381,535 B1 4/2002 Durocher
(Continued)

FOREIGN PATENT DOCUMENTS

EP  1 341 363  9/2003
FR  2 827 695  1/2003
(Continued)

*Primary Examiner* — Thomas Tarcza
*Assistant Examiner* — Edward Pipala
(74) *Attorney, Agent, or Firm* — Mayback & Hoffman, P.A.; Gregory L. Mayback; Rebecca A. Tie

(57) ABSTRACT

A method of providing navigational information includes the step of processing destination information spoken by a user of a mobile processing system and transmitting the processed voice information via a wireless link to a remote data center. The processed voice information is analyzed with a voice recognition system at the remote data center to recognize components of the destination information spoken by the user. The remote data center generates a list of hypothetical recognized components of the destination information listed by confidence levels as calculated for each component of the destination information analyzed by the voice recognition system. The remote data center determines if a confidence score is below a recognition confidence value and, if the confidence score is below the recognition confidence value, transmits an automated request to have the user speak the destination information again.

23 Claims, 8 Drawing Sheets

(56) References Cited

U.S. PATENT DOCUMENTS

| | | |
|---|---|---|
| 6,405,123 B1 | 6/2002 | Rennard |
| 6,999,874 B2 | 2/2006 | Seto |
| 2002/0156570 A1 | 10/2002 | Ohtsuji |
| 2003/0088359 A1 | 5/2003 | Park |
| 2003/0229444 A1 | 12/2003 | Bullock |

FOREIGN PATENT DOCUMENTS

| | | |
|---|---|---|
| WO | 02 48650 | 6/2002 |
| WO | 03 079310 | 9/2003 | ns
SYSTEMS AND METHODS FOR OFF-BOARD VOICE-AUTOMATED VEHICLE NAVIGATION

CROSS REFERENCE TO RELATED APPLICATIONS

This application is a continuation of:
U.S. patent application Ser. No. 13/909,490, filed on Jun. 4, 2013;
U.S. patent application Ser. No. 13/908,421, filed on Jun. 3, 2013;
U.S. patent application Ser. No. 13/901,961, filed on May 24, 2013;
U.S. patent application Ser. No. 12/636,327, filed on Dec. 11, 2009, now U.S. Pat. No. 8,478,520;
U.S. patent application Ser. No. 12/057,984, filed on Mar. 28, 2008, now U.S. Pat. No. 7,634,357; and
U.S. patent application Ser. No. 11/029,971, filed on Jan. 5, 2005, now U.S. Pat. No. 7,373,248 (which application claims priority of U.S. Provisional Patent Application Ser. No. 60/608,850, filed on Sep. 10, 2004),
the entire disclosures of which are hereby incorporated herein by reference in their entireties.

STATEMENT REGARDING FEDERALLY SPONSORED RESEARCH OR DEVELOPMENT

Not Applicable

FIELD OF THE INVENTION

The present invention relates in general to vehicle navigation techniques, and in particular, to systems and methods for off-board voice-automated vehicle navigation

BACKGROUND OF THE INVENTION

Automotive navigation systems have been available for a number of years and are designed to guide vehicle operators to a specified destination. A major shortcoming of conventional navigation systems relates to the methods of entering target destinations. It is well known that driver distraction occurs when a vehicle operator interacts with a keypad or a touch screen while driving. In fact, first time users typically become frustrated with the human factors and associated learning necessary to enter target destinations manually. Furthermore, existing systems allow users to enter destination while driving, which has been shown to cause driver distraction. Entering an address or point of interest (POI) by using manual methods typically requires time and concentration on the vehicle operator's part, and in particular, one cannot watch the road or drive safely. There is ongoing pending litigation that relates to driver distraction and the use of navigation systems while driving.

For most in-vehicle navigation systems, there are sequential steps that occur during usage. The process begins with user interaction where the navigation system first determines the starting location, usually from GPS information. The target destination is typically entered as an address, a street intersection, or a point of interest. It would be a substantial advancement in the art to provide a menu-driven, automatic voice recognition system located at a remote data center that would recognize spoken target destinations while simultaneously utilizing GPS information transmitted from the vehicle over a wireless link to the remote data center. It would also be a significant advancement to provide a voice user interface that is designed to minimize vehicle operator interaction time and/or data center operator interaction time. Finally, it would be a significant advancement if target destinations could be determined with high reliability and efficiency by utilizing the combination of GPS information, voice automation technology, operator assistance, and user assistance for confirming that the specified destination is correct. When necessary, the operator would be involved in determining the target destination that has been spoken, and the vehicle operator (the user) would confirm that the spoken destination is correct before the data center operator becomes involved. An automatic speech recognizer, high-quality text-to-speech, and GPS information each play a role in the overall process of determining a target destination.

SUMMARY OF THE INVENTION

Accordingly, the present invention is directed to a system and a method of delivering, or downloading, navigation information from a remote data center database over a wireless link to a vehicle. The information delivered would be in response to voice-recognized target destinations spoken by the operator of the vehicle. The voice recognition system would be located at the remote data center. The information delivered, or downloaded, could be the target destination POI, street intersection, or address. The destination would be determined through a voice user interface whereby four components are involved in the automation process, including: voice technology, vehicle GPS information, the data center operator, and the vehicle operator. The information delivered, or downloaded, could also be the route information for the target destination POI, or address, determined through the voice user interface.

The primary advantages of the remote data center are flexibility and cost-effectiveness. Accurate, up-to-date data can be accessed and the amount of data can be very large because of memory technology. Because the automation platform is off-board, the application can easily be modified without changing any in-vehicle hardware or software. Such flexibility allows for user personalization and application bundling, in which a number of different applications are accessible through a voice main menu. In terms of cost, server-based voice recognition resources can be shared across a large spectrum of different vehicles. For example, 48 channels of server-based voice recognition can accommodate over 1,000 vehicles simultaneously.

The voice technology requirements for the invention include highly intelligible text-to-speech, speech recognition, n-best search results and associated recognition confidence levels. The term "n-best search results" refers to a common speech recognition output format that rank orders the recognition hypotheses based on probability. The text-to-speech is used to represent what was recognized automatically and can be distinguishable from the vehicle operator's voice. A pronunciation database, also referred to as a phonetic database, is necessary for correct intelligible pronunciations of POIs, cities, states, and street names. For cases in which a recognition result does not have a high confidence score, a recording of what was spoken is played back to the vehicle operator for confirmation that the speech representation, or audio wave file, is correct and recognizable by a human, ultimately the data center operator. For example, if a vehicle operator says a city and state, a street name, and a street number, then the application repeats what was spoken in one of three ways: in a pure computer voice (text-to-speech), a combination of a computer voice and the vehicle operator's voice, or only in the vehicle operator's voice. In the latter case, the data center operator would listen to the speech and determine the address by listening and observing the n-best lists associated with each part of the address. In the former case, the data center operator would not be involved or needed; the process would be full automation. In the hybrid case, the data center operator would listen to part of what was spoken and determine the address by listening and observing the n-best lists associated with the part of the address not automatically recognized. It would be typical for the operator to listen and simply click on the n-best selection that matches the address component in question. Typing the address component would be required if the n-best list does not contain the correct address component. When involved, the data center operator may choose to listen to any component of the address. A similar strategy is used for determining a spoken POI.

For POI entry, the voice user interface can be designed to capture a POI category (e.g., restaurant or ATM) and determine whether the nearest location is desired. If so, the spoken destination entry task is completed after confirmation with a "yes" response. If the nearest location is not desired, a "no" response is spoken and the vehicle operator is prompted to say the name of the POI. Similarly, if the category is not recognized, it is recorded and passed on to the data center operator in addition to the POI name, also recorded if not recognized, subsequent to vehicle operator confirmation that the recording are correct. For POI determination, GPS may be used to constrain the active POI grammar based on a specified radius relative to vehicle location.

If a vehicle operator says a POI category and a POI name, then the application repeats what was spoken in one of three ways: in a pure computer voice (text-to-speech), a combination of a computer voice and the vehicle operator's voice, or just in the vehicle operator's voice only. In the latter case, the data center operator would listen to all of what was spoken and determine the POI by listening and observing the n-best lists associated with the POI category and name. In the former case, the operator would not be involved or needed; the process would be full automation. In the hybrid case, the data center operator would listen to part of what was spoken and determine the POI through listening and observing the n-best list associated with either the POI category or name. It would be typical for the operator to listen and simply click on the n-best selection that matches the POI component in question. Typing the POI component would be required if the n-best list does not contain the correct POI component. When involved, the data center operator may choose to listen to any component of the POI.

The invention described is intended to be integrated with an on-board navigation system capable of real-time GPS processing for route delivery. The navigation system is a hybrid solution in the optimized case because routes cannot be delivered as effectively in real-time from a remote data center. When turn-by turn directions are delivered directly from the remote data center, the GPS information specifying vehicle location can lose synchronization with actual vehicle position due to latencies in wireless communication between the vehicle and the remote data center. For example, a system-generated prompt (e.g., instruction to turn) may be experienced too late by the vehicle operator resulting in a route deviation. In summary, the ideal implementation utilizes on-board technology including real-time GPS information to deliver turn-by-turn directions by voice within the vehicle environment.

With the foregoing and other objects in view, there is provided, in accordance with the invention, a method of providing navigational information including the steps of processing destination information spoken by a user of a mobile processing system, transmitting the processed voice information via a wireless link to a remote data center, analyzing the processed voice information with a voice recognition system at the remote data center to recognize components of the destination information spoken by the user, generating at the remote data center a list of hypothetical recognized components of the destination information listed by confidence levels as calculated for each component of the destination information analyzed by the voice recognition system, determining at the remote data center if a confidence score is below a recognition confidence value, and, if the confidence score is below the recognition confidence value, transmitting from the remote data center an automated request to have the user speak the destination information again.

In accordance with another mode of the invention, if the confidence score is above the recognition confidence value, the list of hypothetical recognized components and confidence levels are displayed at the remote data center for selective checking by a human data center operator, a set of hypothetical components is selected based on the confidence levels in the list, the accuracy of the selected set of hypothetical recognized components of the destination information is confirmed via interactive voice exchanges between the user and the remote data center, and a destination is determined from confirmed components of the destination information.

In accordance with a further mode of the invention, route information to the destination is generated at the remote data center and the route information is transmitted to the mobile processing system from the remote data center via the wireless link.

In accordance with an added mode of the invention, newly spoken destination information from the user is processed and transmitted via a wireless link to the remote data center, the processed newly spoken voice information is analyzed with a voice recognition system at the remote data center to recognize components of the destination information spoken by the user, the remote data center generates a list of hypothetical recognized components of the destination information listed by confidence levels as calculated for each component of the destination information analyzed by the voice recognition system, the remote data center determines if a confidence score is below recognition confidence value, and, if the confidence score is below the recognition confidence value, the remote data center transmits an automated request to have the user speak the destination information again, and, if the confidence score is above the recognition confidence value, the list of hypothetical recognized components and confidence levels is displayed at the remote data center for selective checking by a human data center operator, a set of hypothetical components is selected based on the confidence levels in the list, the accuracy of the selected set of hypothetical recognized components of the destination information is confirmed via interactive voice exchanges between the user and the remote data center, and a destination is determined from confirmed components of the destination information.

In accordance with an additional mode of the invention, the accuracy of the hypothetical recognized components of the destination information is confirmed by transmitting a computer-generated representation of at least one hypothetical recognized component of the destination information to the user via the wireless link and prompting the user via the wireless link to aurally confirm the accuracy of the component of the destination information.

In accordance with yet another mode of the invention, the accuracy of the hypothetical recognized components of the destination information is confirmed by transmitting at least one recorded hypothetical recognized component of the destination information spoken by the user to the user via the wireless link and prompting the user via the wireless link to aurally confirm the accuracy of the hypothetical recognized component of the voice destination information.

In accordance with yet a further mode of the invention, the accuracy of the hypothetical recognized components of the desired destination is confirmed by determining if a confidence level of hypothetical recognized component is above a selected threshold and computer generating a representation of the hypothetical recognized component for transmission to the user when the confidence level is above the selected threshold.

In accordance with yet an added mode of the invention, the destination is determined from the confirmed components comprises providing human data center operator assistance using the developed list of hypothetical recognized components and confidence levels to recognize the desired destination.

In accordance with yet an additional mode of the invention, human data center operator assistance is provided by playing back recorded representations of the destination information spoken by the user to the data center operator for analysis by the data center operator and receiving information from the data center operator identifying the destination.

In accordance with again another mode of the invention, information is received from the data center operator by entering a choice from the displayed list of hypothetical components from the data center operator.

In accordance with again a further mode of the invention, the accuracy of the hypothetical recognized components of the desired destination is confirmed via interactive voice exchanges comprises transmitting aural representations of hypothetical recognized components of the destination information to the user, the hypothetical recognized components of the destination information being selected from the group consisting of aural representations of the destination address number, street name, city, state, and point of interest.

With the objects of the invention in view, there is also provided a system for providing navigational information to a user including a mobile processing system processing and transmitting via a wireless link spoken requests from a user for navigational information to a selected destination and a data center processing the spoken requests for navigational information received via the wireless link. The data center performs automated voice recognition analysis on the spoken requests for navigational information to recognize destination components of the spoken requests, generates a list of hypothetical recognized components of the destination information listed by confidence levels as calculated for each component of the destination information analyzed by the voice recognition system, determines if a confidence score is below a recognition confidence value, and, if the confidence score is below the recognition confidence value, transmitting from the remote data center an automated request to have the user speak the destination information again.

In accordance with another feature of the invention, if the confidence score is above the recognition confidence value, the remote data center displays the list of hypothetical recognized components and confidence levels for selective checking by a human data center operator, selects a set of hypothetical components based on the confidence levels in the list, confirms the accuracy of the set of hypothetical recognized components of the destination information selected at the remote data center via interactive voice exchanges between the user and the remote data center, and determines a destination from confirmed components of the destination information.

In accordance with a further feature of the invention, the data center downloads the navigational information in response to position information received from the on-board system via the wireless link.

In accordance with an added feature of the invention, the remote data center generates route information to the destination and transmits the route information to the mobile processing system via the wireless link.

In accordance with an additional feature of the invention, after sending the automated request to have the user speak the destination information again, the mobile processing system processes newly spoken destination information from the user and transmits the processed newly spoken voice information via the wireless link to the remote data center and the remote data center analyzes the processed newly spoken voice information with a voice recognition system to recognize components of the destination information spoken by the user, generates a list of hypothetical recognized components of the destination information listed by confidence levels as calculated for each component of the destination information analyzed by the voice recognition system, determines if a confidence score is below recognition confidence value and, if the confidence score is below the recognition confidence value, transmits an automated request to have the user speak the destination information again and, if the confidence score is above the recognition confidence value, displays the list of hypothetical recognized components and confidence levels at the remote data center for selective checking by a human data center operator, selects a set of hypothetical components based on the confidence levels in the list, confirms the accuracy of the selected set of hypothetical recognized components of the destination information via interactive voice exchanges between the user and the remote data center, and determines a destination from confirmed components of the destination information.

In accordance with yet another feature of the invention, the remote data center confirms the accuracy of the hypothetical recognized components of the destination information by transmitting a computer-generated representation of at least one hypothetical recognized component of the destination information to the user via the wireless link and prompting the user via the wireless link to aurally confirm the accuracy of the component of the destination information.

In accordance with yet a further feature of the invention, the remote data center confirms the accuracy of the hypothetical recognized components of the destination information by transmitting at least one recorded hypothetical recognized component of the destination information spoken by the user to the user via the wireless link and prompting the user via the wireless link to aurally confirm the accuracy of the hypothetical recognized component of the voice destination information.

In accordance with yet an added feature of the invention, the remote data center confirms the accuracy of the hypothetical recognized components of the desired destination by determining if a confidence level of hypothetical recognized component is above a selected threshold and computer generating a representation of the hypothetical recognized component for transmission to the user when the confidence level is above the selected threshold.

In accordance with yet an additional feature of the invention,

In accordance with again another feature of the invention, the remote data center determines the destination from the confirmed components by permitting a human data center operator to assist the user utilizing the developed list of hypothetical recognized components and confidence levels to recognize the desired destination.

In accordance with again a further feature of the invention, the remote data center plays back recorded representations of the destination information spoken by the user to the data center operator for analysis by the data center operator and receives information from the data center operator identifying the destination.

In accordance with again an added feature of the invention, the remote data center receives information from the data center operator by the data center operator entering a choice from the displayed list of hypothetical components.

In accordance with a concomitant feature of the invention, the remote data center confirms the accuracy of the hypothetical recognized components of the desired destination via interactive voice exchanges by transmitting aural representations of hypothetical recognized components of the destination information to the user, the hypothetical recognized components of the destination information being selected from the group consisting of aural representations of the destination address number, street name, city, state, and point of interest.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-5 of the drawings, in which like numbers designate like parts.

Figure 1A:
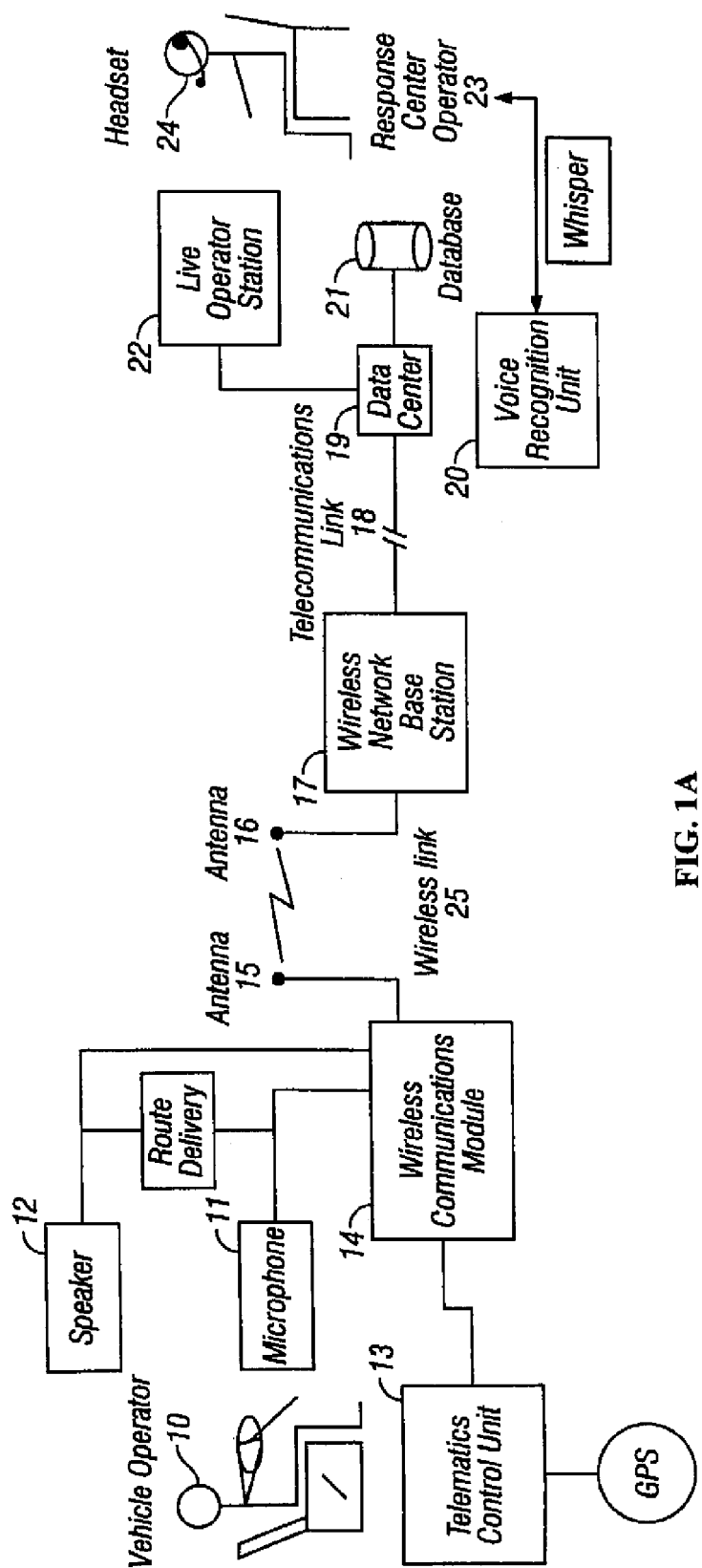
FIG. 1A is a block diagram of an exemplary off-board voice-automated vehicle navigation system embodying the principles of the present invention.
Figure 1B:
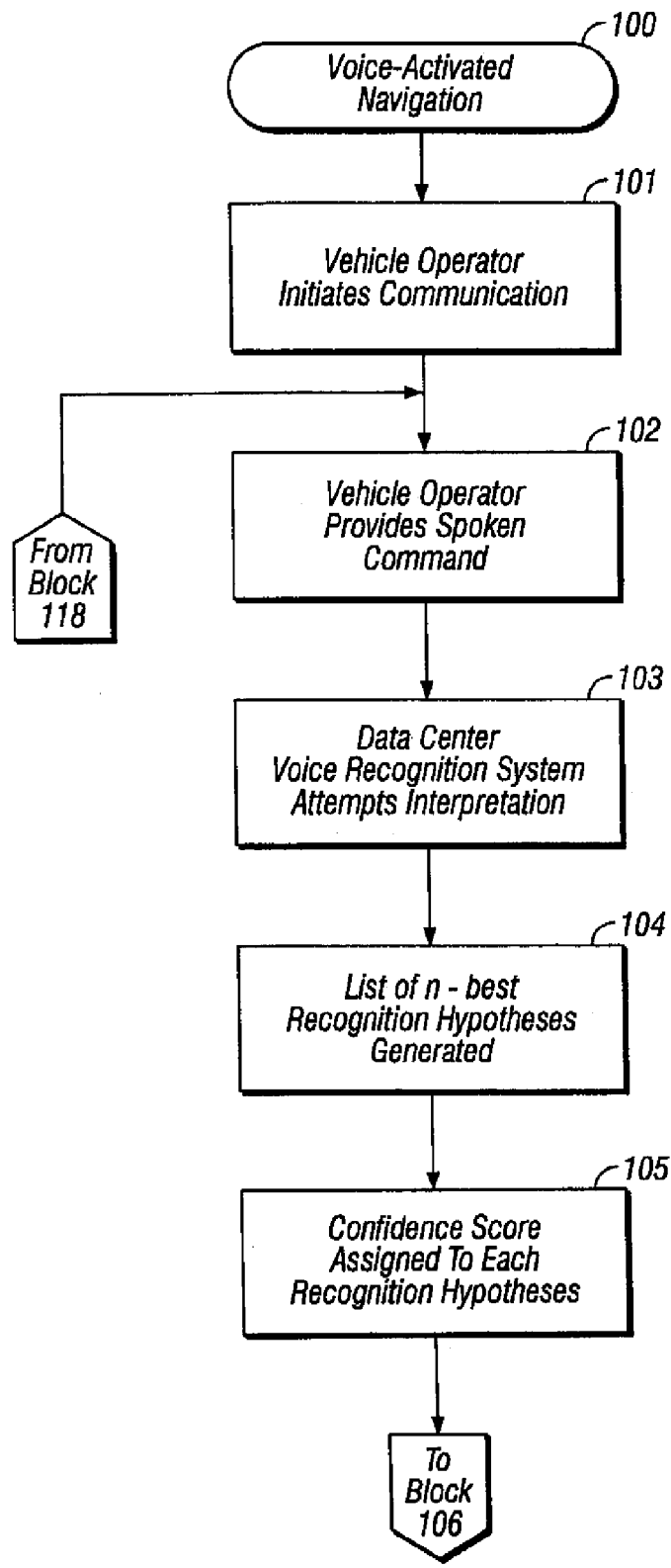
FIG. 1B is a flow chart illustrating representative voice-automated vehicle navigation operations implemented in the system shown in FIG. 1A.
Figure 1B:
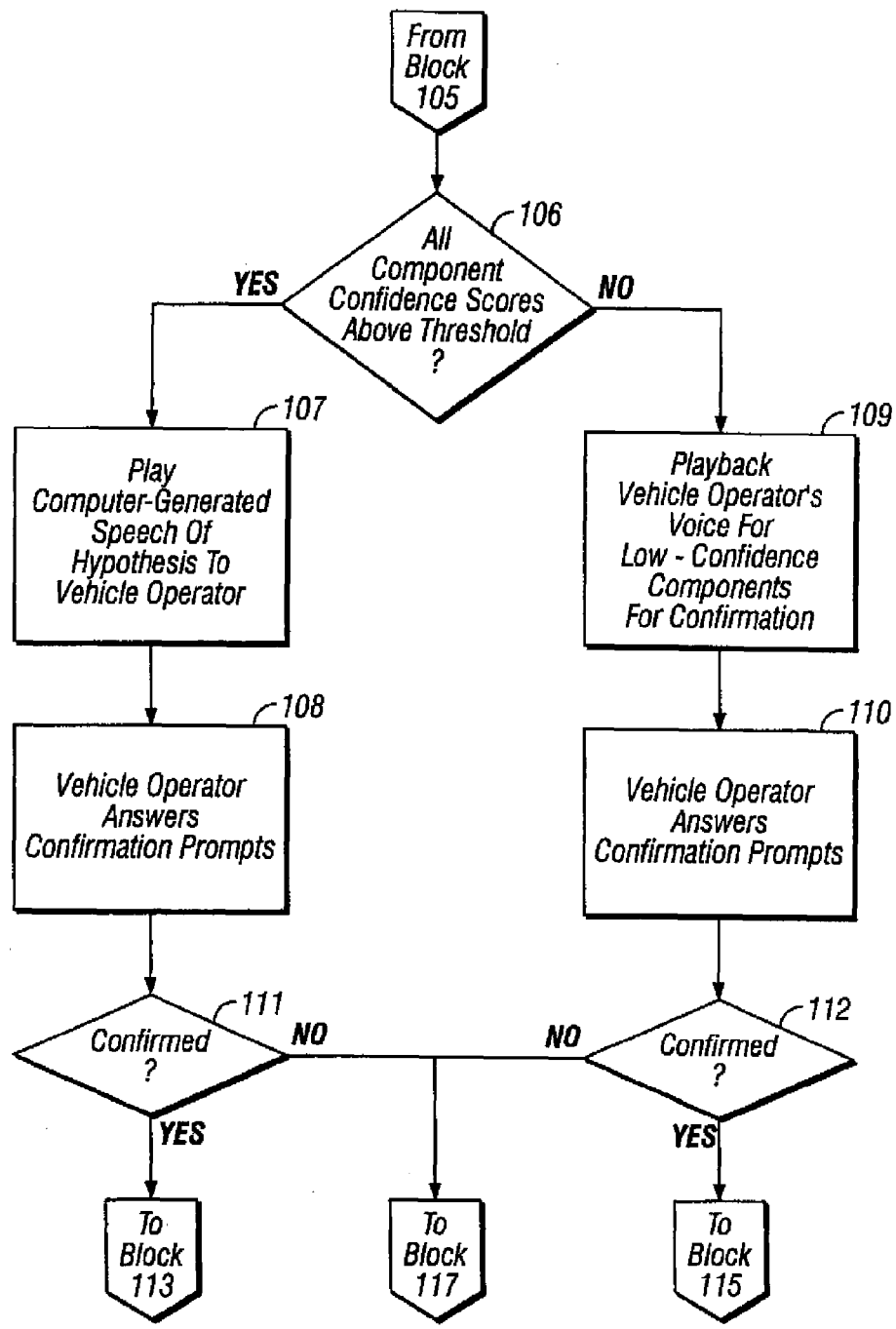
Figure 1B:
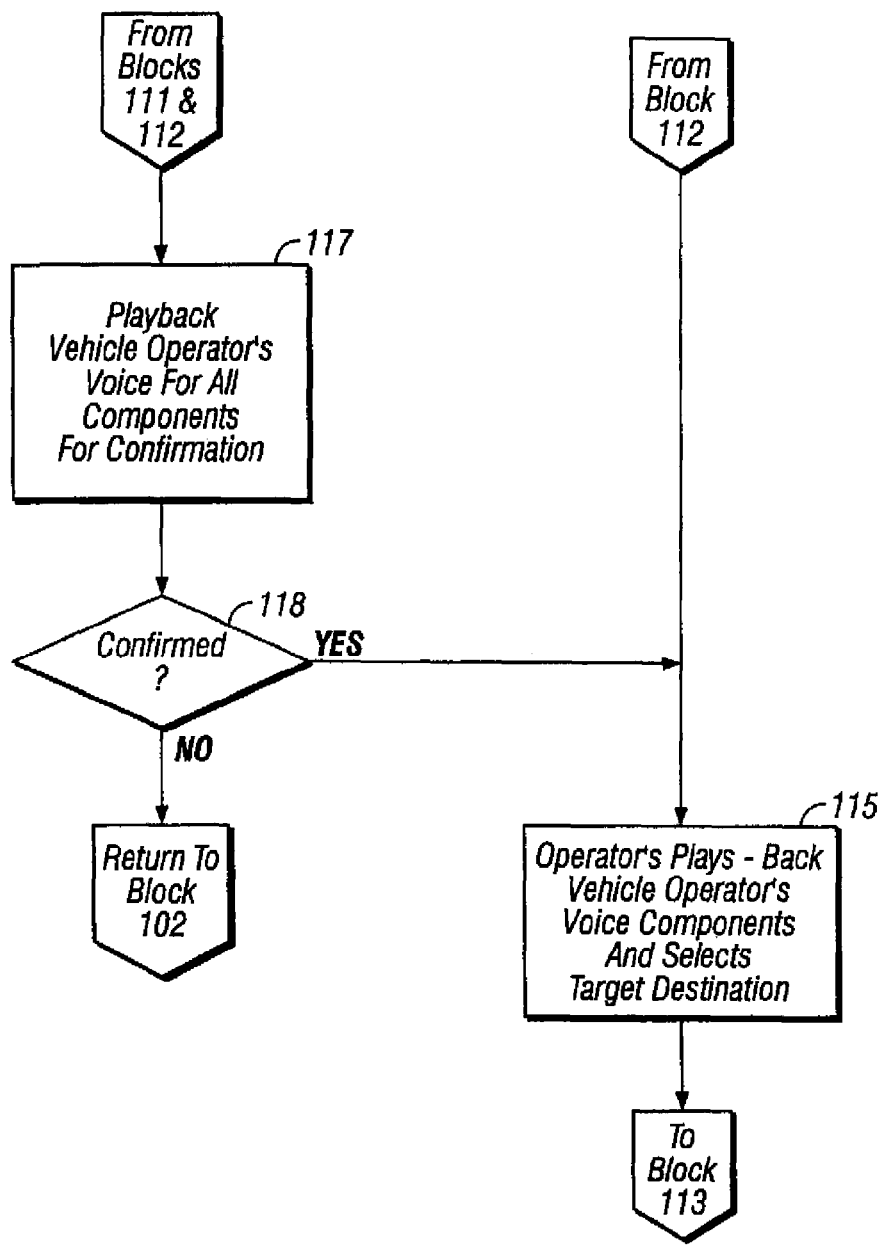
Figure 1B:
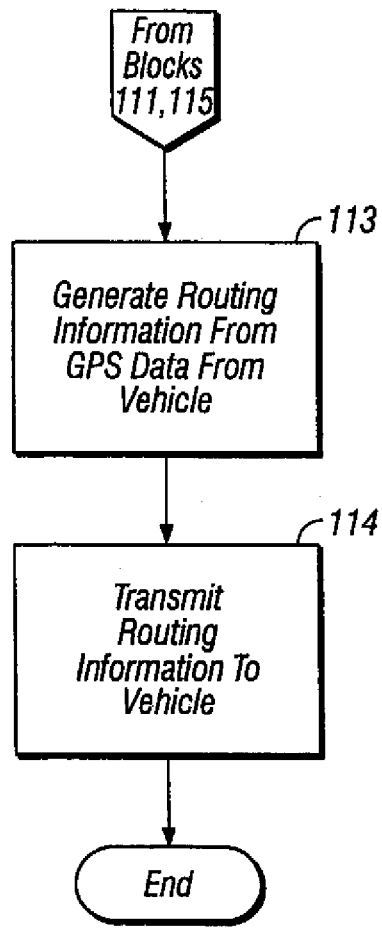

FIG. 1A is a diagram of an exemplary off-board voice-automated navigation system embodying the principles of the present invention. FIG. 1B is a flow chart of a procedure 100 illustrating representative operations of system 100, also embodying the principles of the present invention.

Referring to FIGS. 1A and 1B, when the vehicle operator 10 wishes to enter a target destination in order to receive route guidance, a wireless communications link is initiated to the remote data center 19 at block 101 of procedure 100. The process could be initiated in a number of ways, such as speaking a command in the vehicle or preferably by pressing a button. Communication is established and the vehicle operator 10 speaks commands into the hands-free microphone 11, located in proximity to the vehicle operator 10, at block 102.

The vehicle operator's spoken commands pass over the wireless link 25 through the vehicle mounted wireless communication module 14, through the vehicle mounted wireless antenna 15, through the wireless network's antenna 16 and wireless network base station 17, through one of many telecommunications networks 18, and into the data center 19. From the data center, the voice recognition unit 20 interprets the spoken command(s). The commands include information regarding an address, POI, or street intersection. For an address entry, the city and state may be spoken first.

The voice recognition unit 20 attempts, at block 103 of procedure 100 of FIG. 1B, to recognize the spoken input and at block 104 creates an n-best list of the top hypotheses where n typically does not exceed five (that is, the recognition unit 20 generates up to five text representations of possible city/state combinations, each with an associated probability of correct recognition). Each recognition hypothesis is assigned a confidence score (probability), at block 105, that is normalized to 1. If the top choice is assigned a confidence score above a specified threshold, at decision block 106, the spoken input is considered to be recognized, and computer-generated text-to-speech speech audio is played to the vehicle operator 10 (block 107) for confirmation (block 108). If confirmation is positive at block 111, then at blocks 113 and 114 routing information is generated automatically and transmitted to the on-board unit 13.

The speech audio is directed to the vehicle speaker(s) 12 in a hands-free environment. The vehicle operator 10 responds into the hands-free microphone 11 to each system prompt to specify an address, thereby saying a city, state, street name, and street number. The vehicle operator 10 listens to the vehicle speaker(s) 12 to hear the hypothesized address represented by speech audio that is 1) purely computer generated, 2) purely the vehicle operator's 12, or 3) a combination of the two types of speech audio.

The computer-generated voice, utilized at block 107 of procedure 100, only occurs for recognized utterances (top-choice recognition with high confidence). Destination components (city, state, street name and number, POI, etc.) are otherwise individually aurally identified in the vehicle operator's 12 own voice for confirmation when the confidence score falls below a threshold. In particular, if some, or even all, of the destination components spoken by the vehicle operator have confidence scores below the threshold at block 106 of procedure 100, then at least those low confidence components are played-back to the vehicle owner in the vehicle operator's own voice at block 109, for confirmation at block 110. If the vehicle operator confirms the play-back of block 109, then at decision block 112 procedure 100 continues to block 115 for data center operator assistance for determination of the proper destination and generation of the appropriate navigational directions.

On the other hand, when the first attempted confirmation yields a negative result at either block 111 or block 112 of procedure 100, a second play-back is performed at block 117 and a second confirmation from the vehicle owner is attempted at block 118. For the second attempt at confirmation, all destination components are played-back to the vehicle operator. A positive confirmation, at block 118, concludes the user experience for destination entry, after which the operator becomes involved at block 115, if needed. It should be emphasized that if the target destination is spoken and recorded correctly, it does not need to be spoken again by the vehicle operator 12; however, if the vehicle operator still does not confirm the destination components from the second confirmation attempt, then procedure 100, for example, returns to a main menu and the vehicle operator is requested to repeat the desired destination at block 102.

It is critical to emphasize that the vehicle operator 10 confirms that the stored audio wave file is accurate before the response center operator 23 becomes involved. A yes/no confirmation via the voice recognition unit 20 is required for all destinations before the data center operator 23 becomes involved, if needed at all. If the confirmation is negative, another choice on the n-best entry list is selected at decision block 106, for playback at block 109 and another attempt at confirmation is made at block 110.

Figure 2:
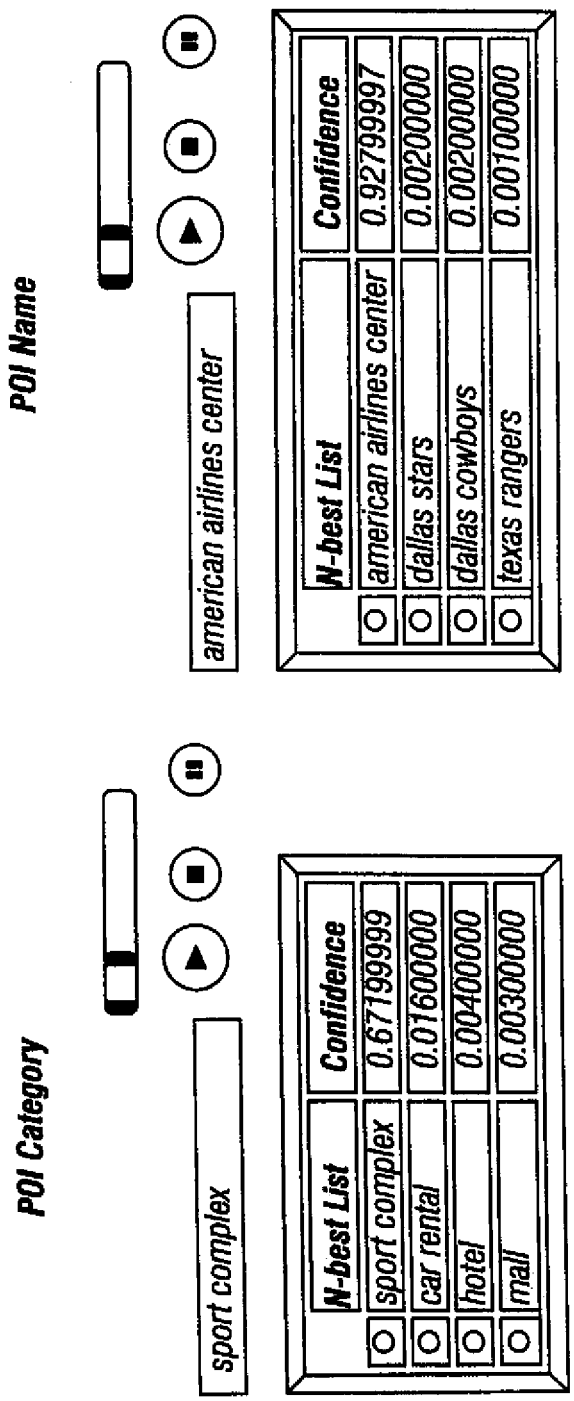
FIG. 2 is a conceptual diagram of a representative data center display suitable for implementing data center operator assistance in target destination recognition based on point of interest (POI) information.

FIG. 2 represents a sample screen shot from the live operator station 22 that is designed to assist the response center operator 23, at block 115 of procedure 100, in determining a target destination. The example shown is for a specific POI, including the corresponding POI category. FIG. 2 illustrates two n-best lists, one for the POI category and one for the corresponding POI. The confidence scores are listed next to each recognition hypothesis shown in the n-best lists, and serve to indicate the relative likelihood that the phrase that was spoken is what is listed. For the hypothesis "sport complex," the confidence score shown is 0.67199999, which is significantly better than the confidence score for the next best choice, 0.01600000 (the hypothesized spoken phrase, "car rental"). The upper two boxes contain text that matches the first choices from the n-best lists. The text contained within the two boxes can be modified by the response center operator either by character 10 by-character entry from a keyboard, or by selecting an n-best entry, also by using a mouse (or keyboard). To the right of each box are audio controls (radio buttons) that allow the stored audio wave files to be played and listened to by the response center operator 23.

The ability of the data center operator to play the audio wave file representations of the spoken destination components is critical to the overall process. For the example under consideration, there are two destination components: the POI category and the POI name. If a phrase other than the top choice is selected from either n-best list, then the text in the corresponding upper box changes automatically. In the example shown, if a different POI category is chosen by the response center operator 23, then a different subsequent grammar can be activated; the n-best list for the POI changes and a new top choice is automatically entered into the upper box for the POI name. The confidence scores for the new n-best list will be quite different and would be expected to be significantly higher if the stored audio wave file matches a grammar entry well. For the example described here, the vehicle operator says a POI category. The category is recognized, and the vehicle operator is asked if the nearest "sport complex" is the desired destination. A positive response completes the destination entry on the user interface side because the GPS information for the vehicle position is all that is needed to determine the route at block 113 of procedure 100. The GPS is used as the starting point, and the nearest POI is determined based on category screening and distance.

Figure 3:
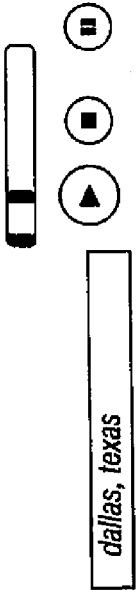
FIG. 3 is a conceptual diagram of a representative data center display suitable for implementing data center operator assistance in target destination recognition based on city and state information.

FIG. 3 represents part of sample screen shot from the live operator station 22 that is designed to assist the response center operator 23, at block 115 of procedure 100, in determining a target destination component. The example shown is for a specific city and state, and includes the n-best list generated by the voice recognition unit 20 for the city and state that was spoken by the vehicle operator 10. The confidence scores are listed next to each recognition hypothesis shown in the n-best list and serve to indicate the relative likelihood that the phrase that was spoken is what is listed. For the hypothesis "Dallas Tex.," the confidence score shown is 0.96799999, which is significantly better than the confidence score for the next best choice, 0.01899999 (the hypothesized spoken phrase, "Alice, Tex.").

Referring again to FIG. 3, the upper box contains text that matches the first choices from the n-best lists. The text contained within the box can be modified by the response center operator either by character-by-character entry from a keyboard, or by selecting an n-best entry by using a mouse. To the right of the upper box are audio controls that allow the stored audio wave files to be played and listened to by the response center operator 23. Again, the ability to play the audio wave file representations of the spoken destination components is critical to the overall process. If a phrase other than the top choice is selected from the n-best list, then the text in the corresponding upper box changes automatically. The audio wave file represents speech provided by the vehicle operator 10 (in this case, a city and state).

Figure 4:
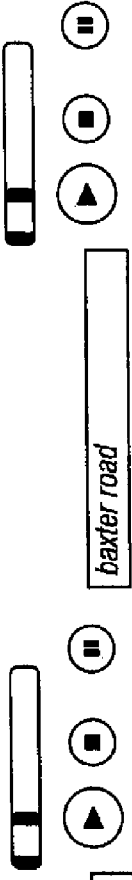
FIGS. 4 and 5 are conceptual diagrams of a representative data center displays suitable for implementing data center operator assistance in target destination recognition based on city, state, and street name information.
Figure 4:
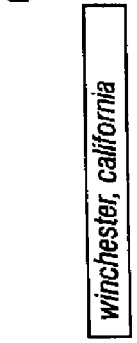

FIG. 4 represents another screen shot from the live operator station 22 that is designed to assist the response center operator 23 in determining a target destination. The example shown is for a specific city, state, and street name. FIG. 4 illustrates two n-best lists, one for the city and state and one for the street name. The confidence scores are listed next to each recognition hypothesis shown in the n-best lists and serve to indicate the relative likelihood that the phrase that was spoken is what is listed. For the hypothesis "Winchester, Calif.," the confidence score shown is 0.18600000, which is not significantly better than the confidence score for the next best choice, 0.14499999 (the hypothesized spoken phrase, "Westchester, Calif."). Referring to FIG. 4, the upper two boxes contain text that matches the first choices from the two n-best lists. The text contained within the two boxes can be modified by the response center operator either by character-by-character entry from a keyboard, or by selecting an n-best entry, by using a mouse (or other means). To the right of each box are audio controls that allow the stored audio wave files to be played and listened to by the response center operator 23.

Figure 5:
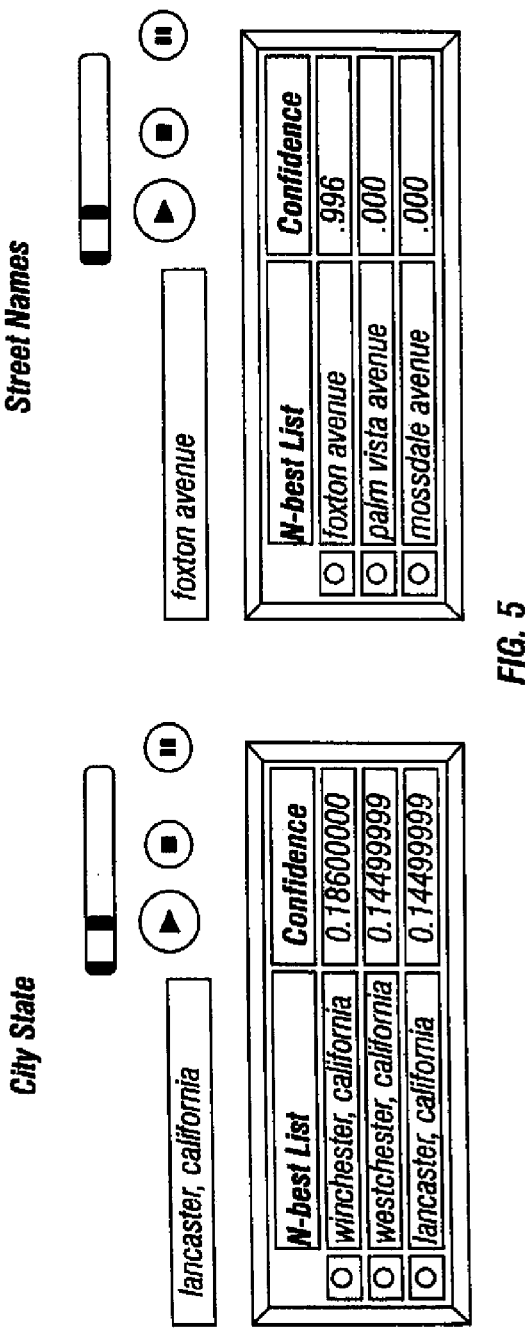

The ability to play the audio wave file representations of the spoken destination components is critical to the overall process. For the example under consideration, there are two destination components: the city/state and the street name. If a hypothesis other than the top choice is selected from either n-best list, then the text in the corresponding upper box changes automatically. In the example shown, if a different city/state is chosen by the response center operator 23, then a different subsequent grammar is activated; the n-best list for the street name changes and a new top choice is automatically entered into the upper box for the street name. FIG. 5 illustrates the result that occurs when "Lancaster, Calif." is chosen by the response center operator 23. The confidence scores for the new n-best list of street names are quite different, and the top choice street has a high confidence score, 0.996, which is close to being a perfect match. Note that the response center operator's 23 task for the example described here is: 1) listen to the city/state audio wave file, 2) select the correct city/state, 3) listen to the street name audio wave file to confirm that it is correct, 4) listen to the street number audio wave file to confirm that it is correct (not illustrated in and make any typed corrections if needed before final submission for navigation-related processing.

The level of captured audio wave files can be normalized by applying digital automatic gain control to improve human intelligibility and user interface consistency during audio play back of destination components. The captured audio can serve to indicate the quality of the network conditions to the vehicle operator. The captured audio teaches the vehicle operator how to speak into the microphone to achieve optimal recognition.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A method of providing navigational information, comprising:
   processing destination information spoken by a user of a mobile processing system;
   transmitting the processed voice information via a wireless link to a remote data center;
   analyzing the processed voice information with a voice recognition system at the remote data center to recognize components of the destination information spoken by the user;
   generating at the remote data center a list of hypothetical recognized components of the destination information listed by confidence levels as calculated for each component of the destination information analyzed by the voice recognition system;
   determining at the remote data center if a confidence score is below a recognition confidence value; and
   if the confidence score is below the recognition confidence value, transmitting from the remote data center an automated request to have the user speak the destination information again.

2. The method according to claim 1, which further comprises, if the confidence score is above the recognition confidence value:
   displaying the list of hypothetical recognized components and confidence levels at the remote data center for selective checking by a human data center operator;
   selecting a set of hypothetical components based on the confidence levels in the list;
   confirming the accuracy of the selected set of hypothetical recognized components of the destination information via interactive voice exchanges between the user and the remote data center; and
   determining a destination from confirmed components of the destination information.

3. The method according to claim 2, which further comprises:
   generating route information to the destination at the remote data center; and
   transmitting the route information to the mobile processing system from the remote data center via the wireless link.

4. The method according to claim 1, which further comprises:
   processing newly spoken destination information from the user;
   transmitting the processed newly spoken voice information via a wireless link to the remote data center;
   analyzing the processed newly spoken voice information with a voice recognition system at the remote data center to recognize components of the destination information spoken by the user;
   generating at the remote data center a list of hypothetical recognized components of the destination information listed by confidence levels as calculated for each component of the destination information analyzed by the voice recognition system;
   determining at the remote data center if a confidence score is below recognition confidence value; and
   if the confidence score is below the recognition confidence value, transmitting from the remote data center an automated request to have the user speak the destination information again; and
   if the confidence score is above the recognition confidence value:
       displaying the list of hypothetical recognized components and confidence levels at the remote data center for selective checking by a human data center operator;
       selecting a set of hypothetical components based on the confidence levels in the list;
       confirming the accuracy of the selected set of hypothetical recognized components of the destination information via interactive voice exchanges between the user and the remote data center; and
       determining a destination from confirmed components of the destination information.

5. The method according to claim 2, wherein the step of confirming the accuracy of the hypothetical recognized components of the destination information comprises:
   transmitting a computer-generated representation of at least one hypothetical recognized component of the destination information to the user via the wireless link; and
   prompting the user via the wireless link to aurally confirm the accuracy of the component of the destination information.

6. The method according to claim 2, wherein the step of confirming the accuracy of the hypothetical recognized components of the destination information comprises:
   transmitting at least one recorded hypothetical recognized component of the destination information spoken by the user to the user via the wireless link; and
   prompting the user via the wireless link to aurally confirm the accuracy of the hypothetical recognized component of the voice destination information.

7. The method according to claim 2, wherein the step of confirming the accuracy of the hypothetical recognized components of the desired destination comprises:
   determining if a confidence level of hypothetical recognized component is above a selected threshold; and
   computer generating a representation of the hypothetical recognized component for transmission to the user when the confidence level is above the selected threshold.

8. The method according to claim 2, wherein the step of determining the destination from the confirmed components comprises providing human data center operator assistance using the developed list of hypothetical recognized components and confidence levels to recognize the desired destination.

9. The method according to claim 8, wherein the step of providing human data center operator assistance comprises:

playing back recorded representations of the destination information spoken by the user to the data center operator for analysis by the data center operator; and receiving information from the data center operator identifying the destination.

10. The method according to claim 9, wherein the step of receiving information from the data center operator comprises entering a choice from the displayed list of hypothetical components from the data center operator.

11. The method according to claim 2, wherein the step of confirming the accuracy of the hypothetical recognized components of the desired destination via interactive voice exchanges comprises transmitting aural representations of hypothetical recognized components of the destination information to the user, the hypothetical recognized components of the destination information being selected from the group consisting of aural representations of the destination address number, street name, city, state, and point of interest.

12. A system for providing navigational information to a user, comprising:

a mobile processing system processing and transmitting via a wireless link spoken requests from a user for navigational information to a selected destination; and a data center processing the spoken requests for navigational information received via the wireless link and:

performing automated voice recognition analysis on the spoken requests for navigational information to recognize destination components of the spoken requests;

generating a list of hypothetical recognized components of the destination information listed by confidence levels as calculated for each component of the destination information analyzed by the voice recognition system;

determining if a confidence score is below a recognition confidence value; and if the confidence score is below the recognition confidence value, transmitting from the remote data center an automated request to have the user speak the destination information again.

13. The system according to claim 12, which further comprises, if the confidence score is above the recognition confidence value, the remote data center:

displays the list of hypothetical recognized components and confidence levels for selective checking by a human data center operator;

selects a set of hypothetical components based on the confidence levels in the list;

confirms the accuracy of the set of hypothetical recognized components of the destination information selected at the remote data center via interactive voice exchanges between the user and the remote data center; and determines a destination from confirmed components of the destination information.

14. The system according to claim 13, wherein the data center downloads the navigational information in response to position information received from the on-board system via the wireless link.

15. The system according to claim 13, wherein the remote data center:

generates route information to the destination; and transmits the route information to the mobile processing system via the wireless link.

16. The system according to claim 12, wherein, after sending the automated request to have the user speak the destination information again:

the mobile processing system processes newly spoken destination information from the user and transmits the processed newly spoken voice information via the wireless link to the remote data center; and the remote data center:

analyzes the processed newly spoken voice information with a voice recognition system to recognize components of the destination information spoken by the user;

generates a list of hypothetical recognized components of the destination information listed by confidence levels as calculated for each component of the destination information analyzed by the voice recognition system;

determines if a confidence score is below recognition confidence value; and if the confidence score is below the recognition confidence value, transmits an automated request to have the user speak the destination information again; and if the confidence score is above the recognition confidence value:

displays the list of hypothetical recognized components and confidence levels at the remote data center for selective checking by a human data center operator;

selects a set of hypothetical components based on the confidence levels in the list;

confirms the accuracy of the selected set of hypothetical recognized components of the destination information via interactive voice exchanges between the user and the remote data center; and determines a destination from confirmed components of the destination information.

17. The system according to claim 13, wherein the remote data center confirms the accuracy of the hypothetical recognized components of the destination information by:

transmitting a computer-generated representation of at least one hypothetical recognized component of the destination information to the user via the wireless link; and prompting the user via the wireless link to aurally confirm the accuracy of the component of the destination information.

18. The system according to claim 13, wherein the remote data center confirms the accuracy of the hypothetical recognized components of the destination information by:

transmitting at least one recorded hypothetical recognized component of the destination information spoken by the user to the user via the wireless link; and prompting the user via the wireless link to aurally confirm the accuracy of the hypothetical recognized component of the voice destination information.

19. The system according to claim 13, wherein the remote data center confirms the accuracy of the hypothetical recognized components of the desired destination by:

determining if a confidence level of hypothetical recognized component is above a selected threshold; and computer generating a representation of the hypothetical recognized component for transmission to the user when the confidence level is above the selected threshold.

20. The system according to claim 13, wherein the remote data center determines the destination from the confirmed components by permitting a human data center operator to assist the user utilizing the developed list of hypothetical recognized components and confidence levels to recognize the desired destination.

21. The system according to claim 20, wherein the remote data center:

plays back recorded representations of the destination information spoken by the user to the data center operator for analysis by the data center operator; and receives information from the data center operator identifying the destination.

22. The system according to claim 21, wherein the remote data center receives information from the data center operator by the data center operator entering a choice from the displayed list of hypothetical components.

23. The system according to claim 13, wherein the remote data center confirms the accuracy of the hypothetical recognized components of the desired destination via interactive voice exchanges by transmitting aural representations of hypothetical recognized components of the destination information to the user, the hypothetical recognized components of the destination information being selected from the group consisting of aural representations of the destination address number, street name, city, state, and point of interest.

* * * * *